(12) United States Patent
Frohnhaus et al.

(10) Patent No.: US 7,069,811 B2
(45) Date of Patent: Jul. 4, 2006

(54) ACTUATION DEVICE OF AN ADJUSTING UNIT FOR AUTOMOTIVE VEHICLE SEATS

(75) Inventors: Ernst-Reiner Frohnhaus, Solingen (DE); Ulrich Karthaus, Remscheid (DE)

(73) Assignee: C. Rob. Hammerstein GmbH & Co. KG (DE)

( * ) Notice: Subject to any disclaimer, the term of this patent is extended or adjusted under 35 U.S.C. 154(b) by 123 days.

(21) Appl. No.: 10/379,207

(22) Filed: Mar. 4, 2003

(65) Prior Publication Data
US 2003/0167872 A1   Sep. 11, 2003

(30) Foreign Application Priority Data
Mar. 8, 2002   (DE)   ................................ 102 10 116
Aug. 23, 2002  (DE)   ................................ 102 38 704

(51) Int. Cl.
*B60N 2/44* (2006.01)

(52) U.S. Cl. .............................. 74/535; 74/143; 74/157; 297/367; 192/43.1

(58) Field of Classification Search .................. 74/143, 74/157, 158, 535, 575, 577 M, 578; 192/43, 192/43.1; 297/367, 361.1
See application file for complete search history.

(56) References Cited

U.S. PATENT DOCUMENTS 5,881,854 A * 3/1999 Rougnon-Glasson ........ 192/15
6,178,838 B1   1/2001 Schwarzbich
6,488,134 B1 * 12/2002 Becker et al. ................ 192/19
2001/0002554 A1   6/2001 Becker et al.
2001/0037925 A1 * 11/2001 Becker et al. ............. 192/43.1

FOREIGN PATENT DOCUMENTS

DE   44 00 910 A1   7/1995
DE   195 40 631 A1   5/1997

* cited by examiner

*Primary Examiner*—Chong H. Kim
(74) *Attorney, Agent, or Firm*—Akerman Senterfitt

(57) ABSTRACT

An actuation device of an adjustment unit for automotive vehicle seats has a hand lever and a frame. The frame carries the hand lever and accommodates an output shaft. The hand lever adopts a central position when the actuation device is in a position of rest, and may be pivoted alternatively in the two directions of rotation against the action of an elastic means biasing it in the central position. The hand lever has a first driving region. An adjustment wheel having circumferential gear teeth is centred on the output shaft. A pivotal lever has a long hole surrounding the output shaft, has a left engagement region and a right engagement region substantially extending as a continuation of the long hole. These regions are both provided with teeth matching the gear teeth of the adjustment wheel and being disengaged from the teeth of the adjustment wheel in the position of rest of the actuation device. The pivotal lever is provided with a second driving region that is in engagement with the first driving region of the hand lever.

16 Claims, 5 Drawing Sheets

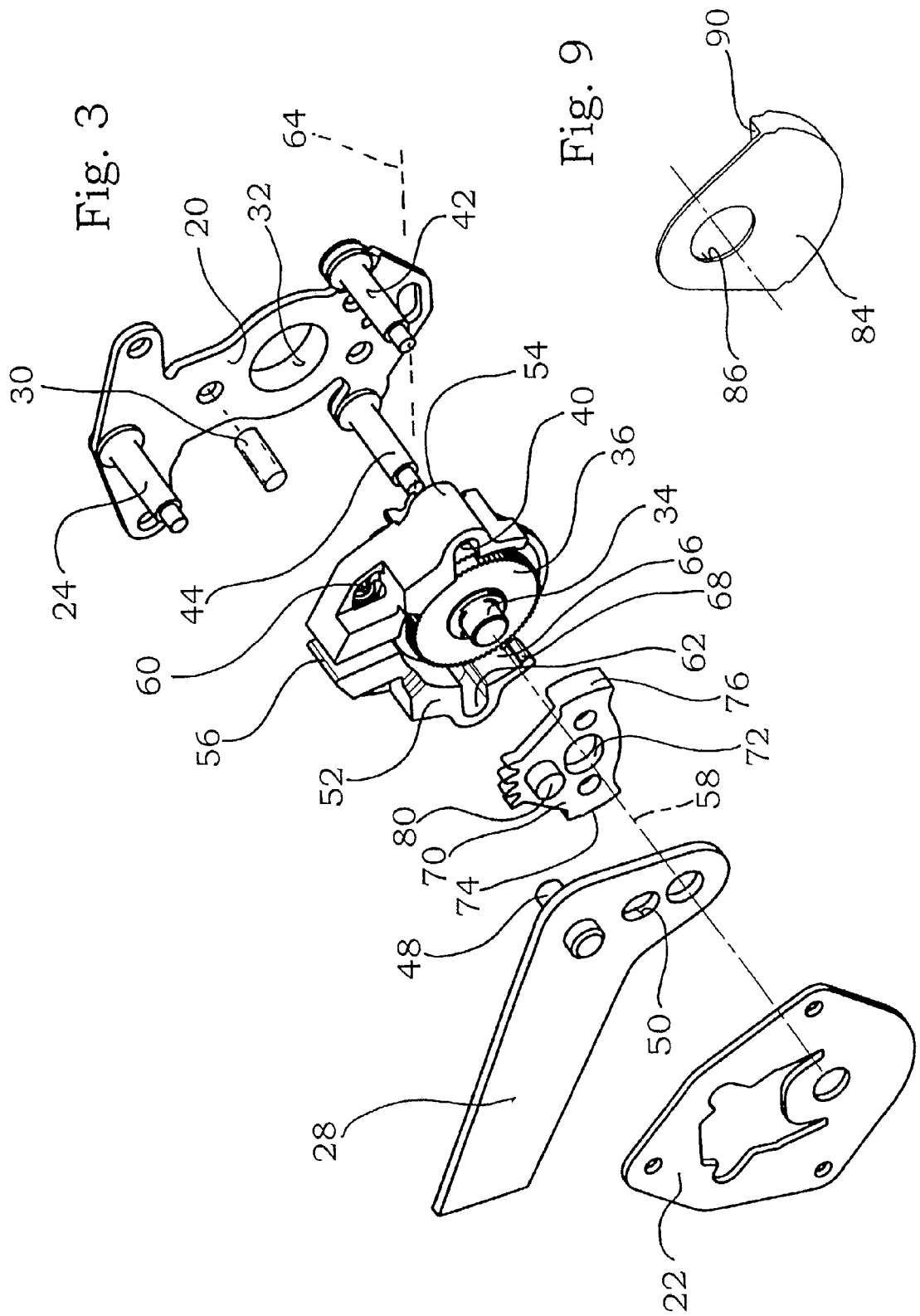

ACTUATION DEVICE OF AN ADJUSTING UNIT FOR AUTOMOTIVE VEHICLE SEATS

FIELD OF THE INVENTION

The invention relates to an actuation device of an adjusting facility for automotive vehicle seats.

BACKGROUND OF THE INVENTION

DE 195 40 631 A describes an actuation device of an adjusting facility for automotive vehicle seats having a hand lever that is carried pivotal about an axis which is fixed with respect to the frame. Said lever is maintained in a central position by elastic means. A pivotal lever, which has two engagement regions, is pivotally hinged to the hand lever. An adjustment wheel that is provided with circumferential gear teeth is rotatably carried on the frame. The adjustment wheel is rotated in the one or in the other direction of rotation through the actuation movements of the hand lever. When the hand lever is actuated, the engagement region located in front in the direction of rotation moves into mesh with the gear teeth of the adjustment wheel, carrying it forward. Upon completion of the driving stroke, a control facility first causes the driving engagement region which is located in front in the direction of rotation to move away from the adjustment wheel, then the return stroke may take place. As a result thereof, the return stroke makes no rattling sound when an engagement region engaged with the teeth of the adjustment wheel is moved back. The two engagement regions are located in immediate proximity to each other; viewed from the axis of the output shaft, they are positioned at an angle of less than 90° to each other.

Such type actuation devices have basically proved efficient. The documents DE 44 00 910 A and EP 0 960 765 A describe similar actuation devices.

It is the object of the invention to improve the actuation device according to DE 195 40 631.1 in such a manner that it is simpler in construction and capable of taking higher manufacturing tolerances while still maintaining silent operation during the working stroke and the return stroke.

SUMMARY OF THE INVENTION

This object is achieved by an actuation device of an adjustment facility for automotive vehicle seats provided with a) a frame that carries a hand lever and accommodates an output shaft, b) a hand lever which, out of a central position which it adopts when the actuation device is in a position of rest, may be pivoted alternatively in the two directions of rotation against the action of an elastic means biasing it in the central position and which has a first driving region, c) an adjustment wheel having circumferential gear teeth and being centered on the output shaft and d) a pivotal lever which has a long hole surrounding the output shaft, a left engagement region and a right engagement region substantially extending as a continuation of the long hole, both of these regions being provided with teeth matching the gear teeth of the adjustment wheel and being disengaged from the teeth of the adjustment wheel in the position of rest of the actuation device, and a second driving region that is in engagement with the first driving region of the hand lever.

In this actuation device, the pivotal lever is no longer carried on the hand lever but rather on the output shaft. The two engagement regions are no longer positioned at an angle of less than 90° but are substantially diametrically opposed, i.e., they are for example positioned at an angle ranging from 150 to 210°. A completely different design is thus possible. The rotating drive is no longer achieved by the engagement region of the pivotal lever which is located in front in the direction of rotation, the meshing engagement region is now located at the back in the direction of rotation. The torque applied to the hand lever is transmitted to the pivotal lever through the first and the second driving region. The initial pivot path of the hand lever is used to laterally displace or pivot the pivotal lever until one of the engagement regions thereof are engaged with the adjustment wheel. Then, rotational transport takes place. For decoupling, the initial pivot path of the return movement is also made use of.

In this actuation device, the hand lever may be rotationally carried on the frame, outside of the adjustment wheel to be driven; in this case, gear reduction or transmission is possible in the driving path, meaning between the movement of the hand lever and the movement of the pivotal lever and, as a result thereof, of the adjustment wheel. It is however also possible to have the hand lever carried within the circumference of the adjustment wheel, more specifically to have it disposed in such a manner that it is rotatable about the output shaft.

The pivotal lever is constantly in operative communication with the hand lever. In the rest position of the actuation device, the pivotal lever is not in operative communication with the adjustment wheel. In order to bring it into operative communication with the adjustment wheel, it first must be displaced or pivoted toward the left or the right to the extent that the corresponding engagement region is capable of engaging with the gear teeth of the adjustment wheel. The two engagement regions are facing each other. If the circumferential gear teeth of the adjustment wheel are external gear teeth, the two engagement regions are designed in such a manner that the tips of the teeth point toward the output shaft. If the circumferential gear teeth of the adjustment wheel are internal gear teeth, the teeth of the engagement regions point outward from the output shaft.

In the preferred embodiment, the adjustment wheel is part of a silent ratchet as it is described for example in DE 199 58 300 A. In this case, the adjustment wheel is not non-rotatably connected to the output shaft; the output shaft is normally locked and is only rotated when the adjustment wheel has been caused to slightly turn, namely to the extent that the silent ratchet is released from the locked position and is allowed to carry the shaft along.

The first portion of the pivotal movement of the hand lever out of its central position is used to move the pivotal lever into mesh with the adjustment wheel, meaning to move the corresponding engagement region of the pivotal lever into mesh with the gear teeth of the adjustment wheel. As the hand lever is caused to pivot further along its pivot path, said engagement is positively maintained by the fact that one component participating in the driving force is directed in such a manner that it maintains the engagement between the engagement region and the adjustment wheel. Only when the hand lever is caused to move in the reverse pivotal direction is this positive coupling force cancelled.

The pivotal lever has a long hole surrounding the output shaft and extending in the direction of the joining line between the two guide axes. In this way, the sequence of movements the pivotal lever is allowed to execute relative to the adjustment wheel is easily realized. At the beginning, the pivotal lever is to be displaced to the left or to the right relative to the adjustment wheel, the long hole is suited for this purpose and is chosen sufficiently long therefore. Next, the pivotal lever is to rotate together with the adjustment wheel, the long hole providing sufficient support for the pivotal lever. For, on the one side, said pivotal lever is supported by the adjustment wheel at its meshing engagement region and, on the other side, it is directly supported by the output shaft through the long hole.

In a preferred embodiment of the invention a rotation fixation device is assigned to the pivotal lever, which rotation fixation device is rotatably carried on the output shaft and is provided with a left and a right supporting region supporting a respective one of the associated left and right engagement regions. The rotation fixation device promotes the initial displacement movement of the pivotal lever, which is necessary for coupling. The rotation fixation device allows the pivotal lever to slide laterally, meaning to the left or to the right. For this purpose it is provided with the two supporting regions. The left supporting region is located beneath the left engagement region and, on the right side, the right supporting region is located in the same way beneath the right engagement region. As the rotation fixation device is rotatably carried about the output shaft, it is also capable of rotating about the output shaft. This happens as soon as the pivotal lever and the adjustment wheel are engaged, thus allowing the adjustment wheel to rotate.

In another preferred embodiment, there is provided that the pivotal lever is configured to substantially form an isosceles triangle, that the engagement regions are located at the two ends of said isosceles triangle's base and are oriented substantially parallel to each other and that the second driving region is positioned in spaced relationship from the base and is preferably arranged above the center of the base. It is important that the second driving region be positioned in spaced relationship from the base so that a rotational movement may be imparted by the hand lever to the pivotal lever. If the second driving region were located on the base, the pivotal lever could be readily displaced but it could not be driven rotationally. By disposing the second driving region centrally above the base it is achieved that the coupling movement and the drive movement are executed in the same way in the two directions of rotation of the adjustment wheel.

In the preferred development, the pivotal lever is elastically biased in such a manner that, when the actuation device is in its position of rest, it adopts a central position in which the two engagement regions thereof are removed from engagement with the gear teeth of the adjustment wheel. The central position of the pivotal lever is predetermined as a result thereof. The elastic means may for example be springs that are accommodated in the long hole to the left and right side of the drive shaft, i.e., they are supported on the one side by the output shaft and on the other side by the left or right end region of the long hole. However, the elastic means may also be formed by spring levers that are disposed laterally and act onto the pivotal lever in such a manner that it is biased in its central position. Simultaneously, a mechanical guide and a mechanical catch may be achieved by way of these pivotal levers or similar devices.

In a further improvement it is suggested that the engagement regions have external faces that are centered on the axis of the output shaft and that a left spring lever and a right spring lever having stop faces are provided which are free in inward direction, are centered on the axis of the output shaft and are located in immediate proximity to the external faces. Within the pivoting angle of the pivotal lever the external faces of the engagement regions may slide along the stop faces by means of which they are guided. This occurs during the return stroke for example.

In further developing the just discussed improvement it is suggested that the left and the right spring lever have driving faces that are facing each other, between the two of which are located a stop of the frame and a catch of the hand lever, that they each have a guide region in which they are pivotal about a left or a right guide axis rigidly mounted to the frame and are slidably guided in the direction of the long hole, that they are urged by a spring acting along a line which is oriented beneath the stop and the catch on the one hand and above the guide regions on the other hand and elastically biases the two spring levers toward each other.

With the external face of its disengaged engagement region, the pivotal lever only pushes the neighboring spring lever outward as long as a working stroke is being performed, meaning as long as the hand lever is moved away from its central position. As soon as the hand lever starts the return stroke toward the central position, the hand lever no longer exerts onto the pivotal lever the force ensuring engagement between the corresponding engagement region and the adjustment wheel, which is necessary for causing the adjustment wheel to move. The described deviated spring lever rather pushes the pivotal lever back into its central position until it is brought to fit on the other spring lever. As a result thereof, the pivotal lever is not allowed to move beyond its central position and remains in said position. In said central position it is then rotated back into its initial position which corresponds to the hand lever which is in its central position.

The guide regions perform two functions. On the one side, they allow the spring lever to pivot about a guide axis, on the other side, they allow the guide lever to be guided in a longitudinal guide. Altogether, the spring levers are not firmly disposed or carried somewhere but are rather kept in place by the spring alone and are ineffectual when the spring fails.

In an advantageous development it is suggested that the line along which the spring acts is substantially nearer to the stop and to the catch than to the axis of the output shaft. As a result thereof, the force needed for deviating a spring lever is smaller in the region of the pivotal lever than in the region of the catch. The line along which the spring acts is oriented transversely to the joining line between the output shaft and the stop of the frame.

In still another preferred embodiment the spring levers are each provided with retaining means that fix the pivotal lever so as to prevent rotation thereof and that may be overcome when the torque applied to the pivotal lever is high enough. In a particularly preferred embodiment, the retaining means of each spring lever is formed by a lug which is disposed on the lower end of the spring lever and protrudes toward the output shaft, engaging below a lower end region of the engagement region of the neighboring spring lever when the actuation device is in its position of rest. Thanks to said retaining means, the pivotal lever is displaced first and only rotates thereafter, more specifically after engagement thereof. The retaining means, which is configured as a lug for example, is configured, molded for example, in such a manner that the retaining means may only be overcome by a torque such as it is generated during the drive of the adjustment wheel.

Further advantages and characteristics will become apparent in the remaining claims and in the following non restrictive description of embodiments, given by way of example only with reference to the drawings.

BRIEF DESCRIPTION OF THE DRAWINGS

FIG. 3 is a perspective view in the form of an assembly drawing of a second embodiment of the actuation device, FIG. 8 is a top view of a fourth exemplary embodiment which is in a position of rest and differs from FIG. 4 in that the pivotal lever is articulated to the rotation fixation device and FIG. 9 is a perspective view of a rotation fixation device in the same viewing direction as in FIG. 3.

DETAILED DESCRIPTION OF THE INVENTION

Figure 1:
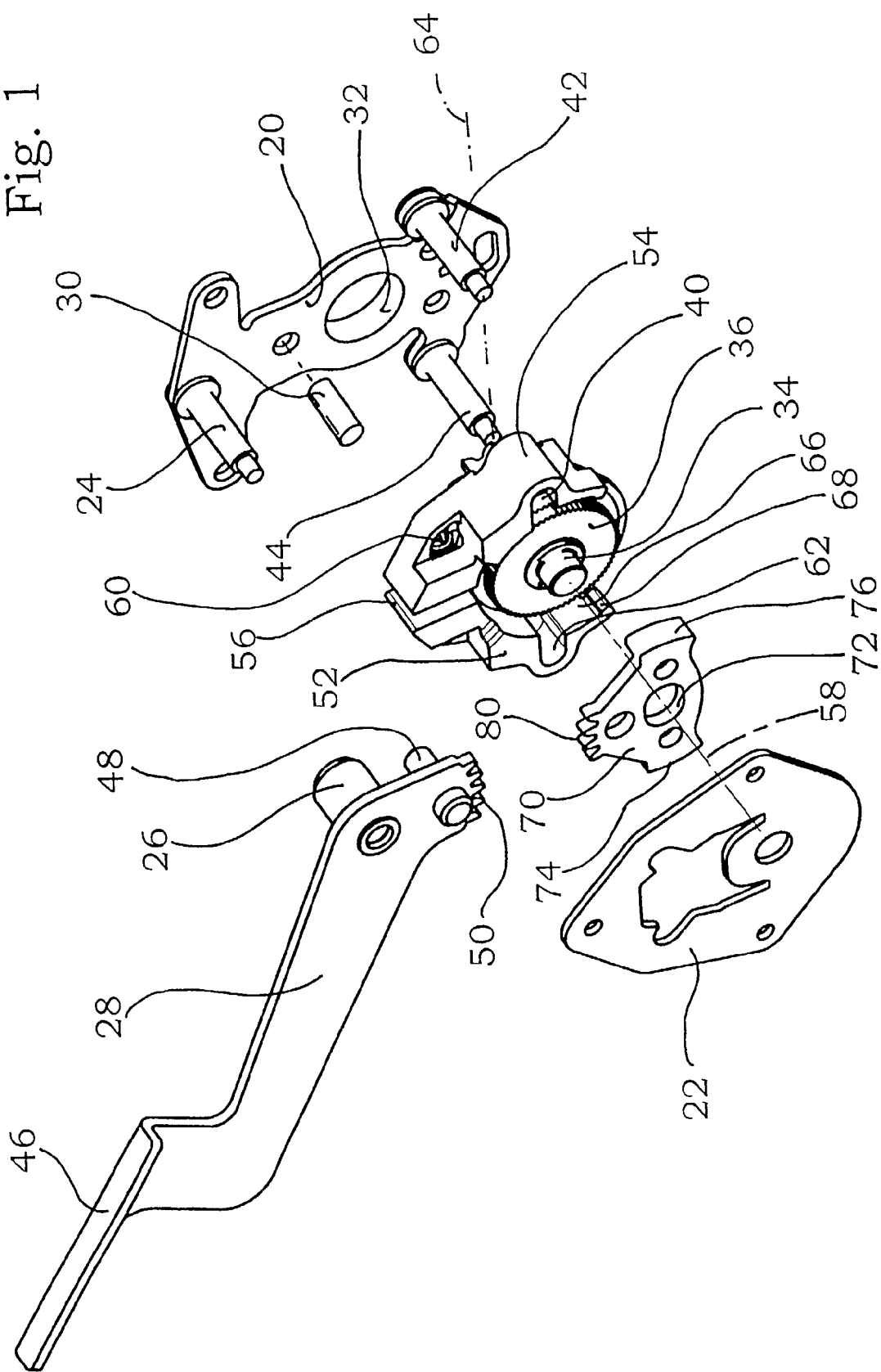
FIG. 1 is a perspective view in the form of an assembly drawing of a first embodiment of the actuation unit.

The actuation device has a frame which, in the first embodiment according to FIG. 1, is provided with a base plate 20 and with a cover 22. A first stud bolt 24 protrudes from the top portion of the base plate 20 of the frame, said stud bolt engaging into a bearing sleeve 26 of a hand lever 28, the hand lever 28 being pivotally carried on the frame as a result thereof. Further, the base plate 20 of the frame has a stop 30 that protrudes somewhat underneath the first stud bolt. Approximately in the center of the base plate 20 there is a bearing bore 32 for an output shaft 34 of an adjustment wheel 36. A pinion 38 can be seen, which is non-rotatably connected to the output shaft 34 and which may be passed through the bearing bore 32. The adjustment wheel 36 is centered on the output shaft 34 and rotates in unison therewith upon actuation of a silent ratchet 40. The silent ratchet 40 is well known in the art and will not be described in closer detail herein.

On either side of the output shaft 34, a right stud bolt 42 and a left stud bolt 44 protrude parallel to the first stud bolt 24.

The already mentioned hand lever 28 has an actuation region 46. At its end opposite the actuation region 46 and in proximity to the bearing sleeve 26, it further has a catch 48 and at the free end it has a first driving region 50 configured to form gear teeth that are centered on the axis of the bearing sleeve 26 in the present case.

On the left side of the silent ratchet 40 there is located a left spring lever 52, on the right side of the silent ratchet 40 there is located a right spring lever 54. In the top portion, each spring lever 52, 54 has a driving face 56. The two driving faces 56 of the two spring levers 52, 54 are facing each other. The catch 48 of the hand lever 28 on the one side and the stop 30 of the frame on the other side are located therein between. The catch 48 is thereby nearer to an axis 58 of the output shaft 34 than the stop 30.

In the lower region of these driving faces 56 and above the silent ratchet 40, there is disposed a spring 60 which is configured as a tension spring and is supported at one end region thereof by the left spring lever 52 and at the other end region by the right spring lever 54. It pulls the two spring levers 52, 54 toward each other. As a result, when the actuation device is in its position of rest, the two driving faces 56 abut on both the catch 48 and the stop 30.

From their upper portion, in which the two spring levers 52, 54 are provided with the driving faces 56, the two spring levers 52, 54 extend downward in a curved region, where they conform to the contour of the substantially round silent ratchet 40. They extend through slightly more than 90° spandrel. In said lower region, the spring levers 52, 54 have one guide region each. In the guide region, they are pivotally arranged about a guide axis which is rigidly mounted to the frame and is realized by a respective one of the two stud bolts 42, 44. Further, the guide region is provided with a longitudinal guide 62 which is formed by an oblong hole provided in the respective one of the spring levers 52, 54 and extends in the direction of one of the two stud bolts 42, 44 and as a result thereof, in the direction of a line 64 joining the two guide axes.

As a result, the spring levers 52, 54 may be pivoted independent of one another about the respective one of the stud bolts 42, 44 on the one hand and on the other hand they may be displaced outward within their longitudinal guide 62. The spring 60 ensures that, when the actuation device is in its position of rest, the stud bolts 42, 44 abut on the end of the longitudinal guide 62 which is remote from the axis 58. Said axis 58 lies slightly underneath the joining line 64.

In proximity to the guide region, the spring levers 52, 54 each form a stop face 66 that is substantially centered on the axis 58. At the lower free end, the spring levers 52, 54 each have a retaining means 68 in the form of a lug. The lug protrudes toward the axis 58 and has small dimensions.

The adjustment wheel 36 has circumferential gear teeth. A pivotal lever 70, which has a long hole 72 surrounding the output shaft 34, is disposed in front of the adjustment wheel. The long hole 72 extends parallel to the joining line 64. Further, the pivotal lever 70 has a left engagement region 74 and a right engagement region 76. These regions are facing each other, in the exemplary embodiment according to FIG. 1 they are facing each other on a diameter which is oriented parallel to the joining line 64. The engagement regions 74, 76 have teeth 78 that are configured to match the gear teeth of the adjustment wheel 36 with which they cooperate. In the position of rest, the teeth 78 are released from engagement with the gear teeth of the adjustment wheel 36.

Finally, the pivotal lever 70 has a second driving region 80 which is constantly engaged with the first driving region 50 of the hand lever 28 and is configured as a module gear in the same way as said first region in the exemplary embodiment according to FIG. 1.

Figure 2:
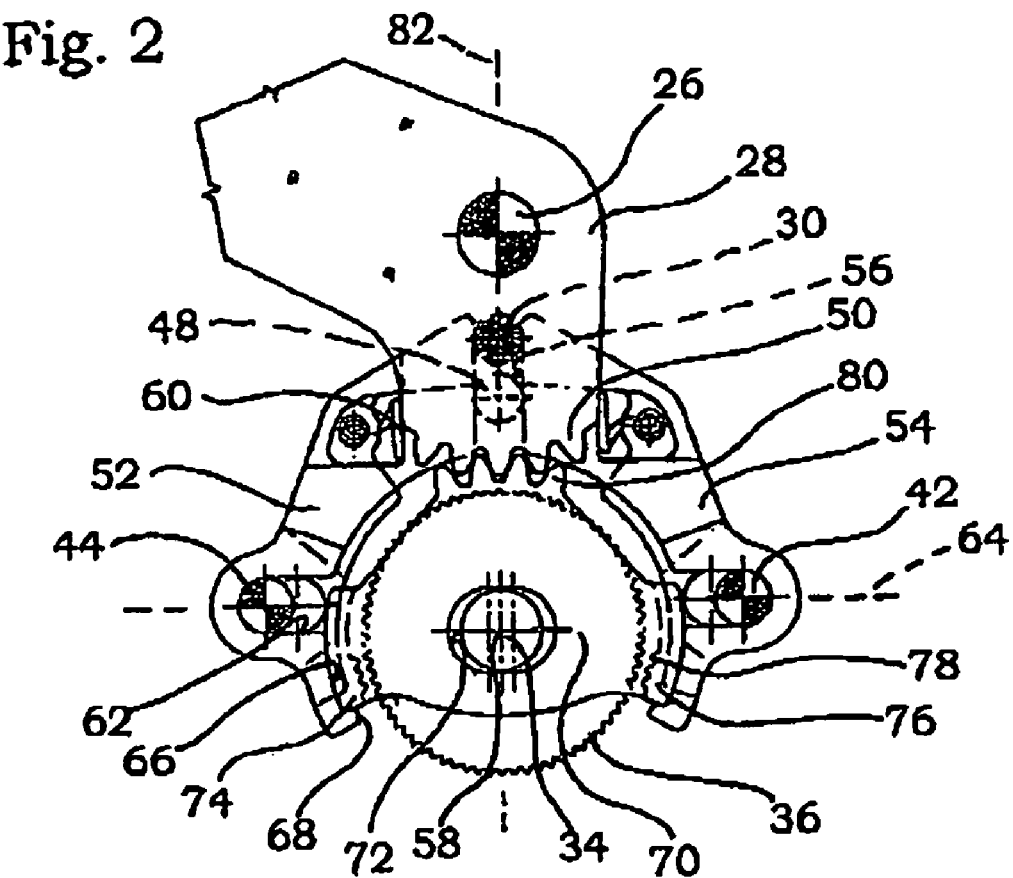
FIG. 2 is a top view of an actuation unit similar to FIG. 1, but without cover for the frame and modified base plate of the frame.

As may be more specifically surveyed from FIG. 2, the pivotal lever 70 may be described substantially as an isosceles triangle. Said triangle has a base on the two ends of which there are located the engagement regions 74, 76, which are oriented substantially parallel to each other. The second driving region 80 is positioned in spaced relationship from the base and on a center line of the triangle. When the actuation device is in its position of rest, the axis 58 of the output shaft 34, the center of the engagement between the first driving region 50 and the second driving region 80, the catch 48, the stop 30 and the axis of the bearing sleeve 26 are aligned along a line 82 in the sequential order mentioned. Said line 82 is oriented perpendicular to the joining line 64. Except for the flared form of the hand lever 28, of its actuation region in particular, the arrangement exhibits 2-fold symmetry about a plane which is defined by the line 82 and the axis 58. The line along which the spring 60 acts is oriented perpendicular to said line 82 and is located in proximity to the catch 48 and outside of the adjustment wheel 36.

The second exemplary embodiment according to FIG. 3 differs from the embodiment discussed herein above in that the hand lever 28 is now disposed so as to be pivotal about the axis 58 of the output shaft 34. The first driving region 50 thereof is now configured as an oblong hole that is in engagement with a bolt which forms the second driving region 80 and protrudes from the pivotal lever 70 of which it is a part toward the axis 58.

But for this feature, this exemplary embodiment does not differ from the first embodiment according to the FIGS. 1 and 2.

The third exemplary embodiment according to the FIGS. 4 through 8 differs from the first embodiment in that there is provided an additional rotation fixation device 84. It is assigned to the pivotal lever 70 and cooperates therewith. It has a bore 86 by which it is carried so as to be pivotal about the output shaft 34. It further has a left supporting region 88 and a right supporting region 90. Said regions engage beneath the respective one of the engagement regions 74, 76 of the pivotal lever 70. Thanks to its long hole 72, the pivotal lever 70 may be displaced to the left and to the right, the lower ends of the engagement regions 74, 76 thereof sliding thereby on the supporting regions 88, 90.

The sequence of operation will be described herein after with reference to the third exemplary embodiment which is illustrated in the four different actuation conditions represented in the FIGS. 4 through 7.

Figure 4:
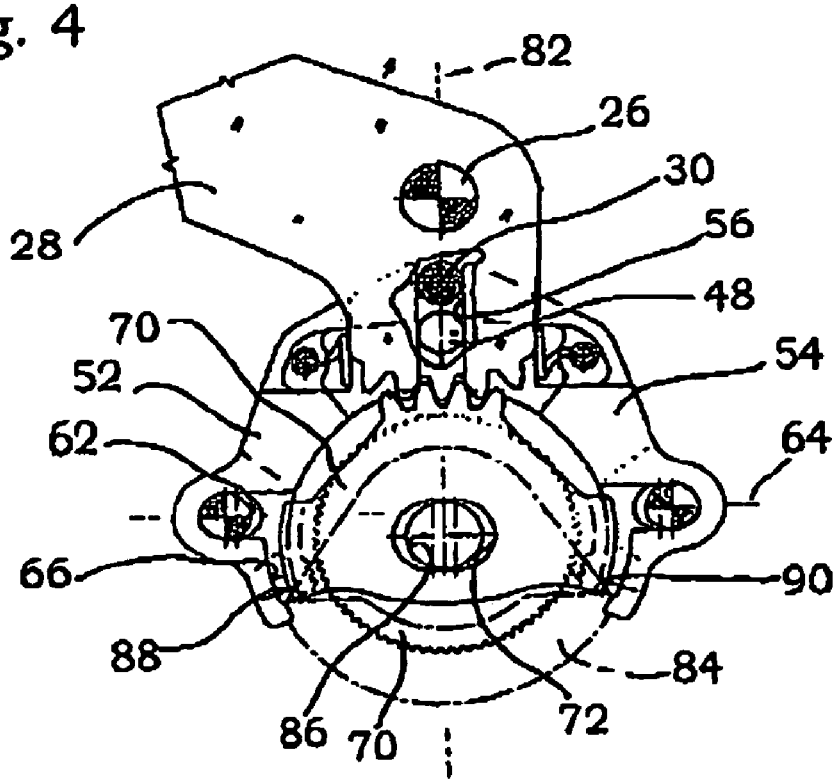
FIG. 4 is a top view of an actuation device in a third embodiment; it differs from the first embodiment according to FIG. 2 by an additional rotation fixation device, the actuation device being shown in its position of rest.

In the position of rest shown in FIG. 4, the parts are symmetrically arranged. The pivotal lever 70 is disengaged from the adjustment wheel 36, the output shaft 34 abuts on the top and the bottom of the long hole 72 and is otherwise centered within the long hole 72 so that a second air gap 92 forms between the left end region of the long hole 72 and the output shaft 34 and a fourth air gap 94 forms between the output shaft 34 and the right end region of the long hole 72. Said air gaps 92, 94 have substantially the same dimensions. A first air gap 96, which is not greater than, and preferably as great as, the second air gap 92, is left free between the left engagement region 74 and the adjustment wheel. In just the same way, a third air gap 98, which is not greater than, and preferably as great as, the fourth air gap 92, is left free between the right engagement region 76 and the adjustment wheel 36.

The stop faces 66 of the spring levers 52, 54 are located in proximity to the neighboring outer borders of the engagement regions 74, 76. In proximity to their supporting regions 88, 90, the rotation fixation device 84 has steps 104 on which abut the retaining means 68, i.e., the lugs at the lower end of the spring levers 52, 54. As a result, the rotation fixation device 84 is at first locked against rotation.

Figure 5:
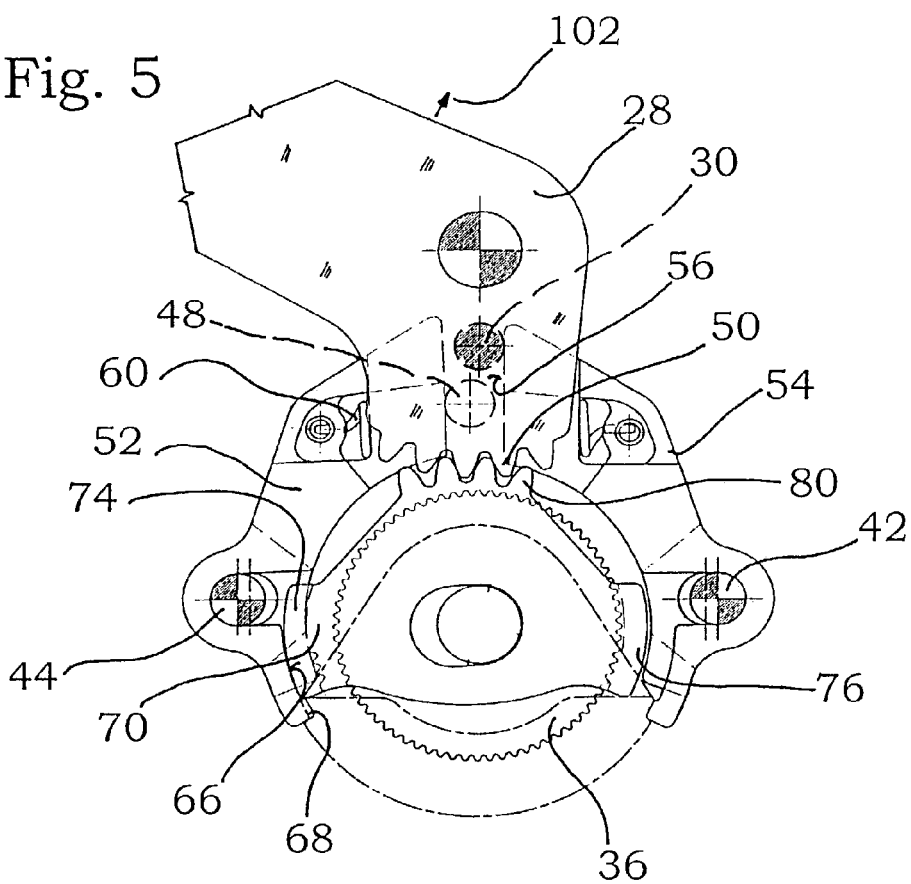
FIG. 5 is a top view of the third exemplary embodiment after coupling.

In view of FIG. 4, the hand lever 28 in FIG. 5 is pivoted upward in the direction of the arrow 102 to such an extent that, through the transmission of its movement via the driving regions 50, 80, the pivotal lever 70 is displaced to the left. It is displaced to the left to such an extent that its right engagement region 76 is now in engagement with the gear teeth of the adjustment wheel 36. The left engagement region 74, by contrast, has moved further away from the adjustment wheel 36 and abuts now with its outer border on the stop face 66 of the left spring lever 52. The latter has remained in position. The right spring lever 54 however is slightly deviated on the top by the catch 58 which pushed the driving face 56 of the right spring lever 54 to the right; the movement occurs about the axis formed by the right stud bolt 42.

The condition according to FIG. 5 shows the completed coupling between the pivotal lever 70 and the adjustment wheel 36; a driving stroke is now possible. The force acting in the direction of the arrow 102 during the working stroke keeps the pivotal lever 70 in the coupled condition. Accordingly, the driving force promotes coupling. As, in the position shown in FIG. 5, the pivotal lever 70 can no longer be displaced because it now abuts on the adjustment wheel 36, it is necessarily rotated; the adjustment wheel 36 is rotated through the coupled pivotal lever 70, the result thereof is shown in FIG. 6.

Figure 6:
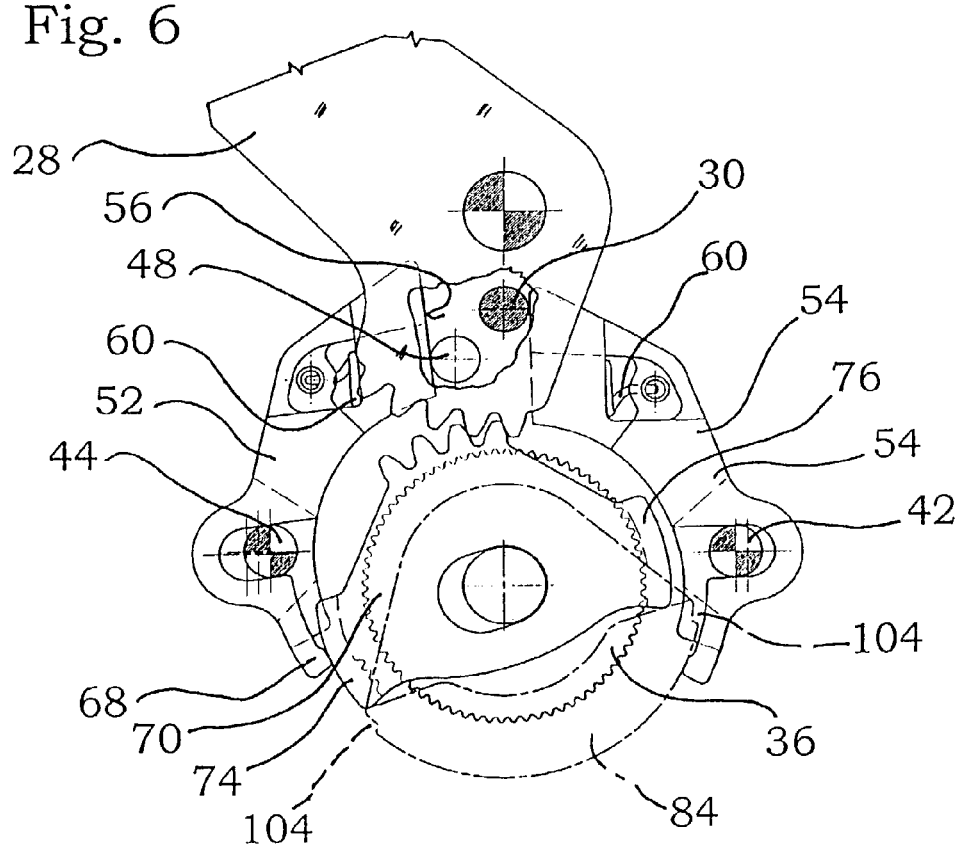
FIG. 6 is a top view of the third exemplary embodiment after completed transport.

FIG. 6 shows the condition of the already completed driving stroke. The shoulders 104 of the rotation fixation device 84 have been released from engagement with the lugs 68 by the rotating drive. This applies to the right shoulder which lifted the right lug outward. It also applies to a left lower edge of the left engagement region 74 which lifted the left lug outward so that it now abuts on the outer wall of the left engagement region 74. The right lug abuts on the outer wall of the rotation fixation device 84.

Figure 7:
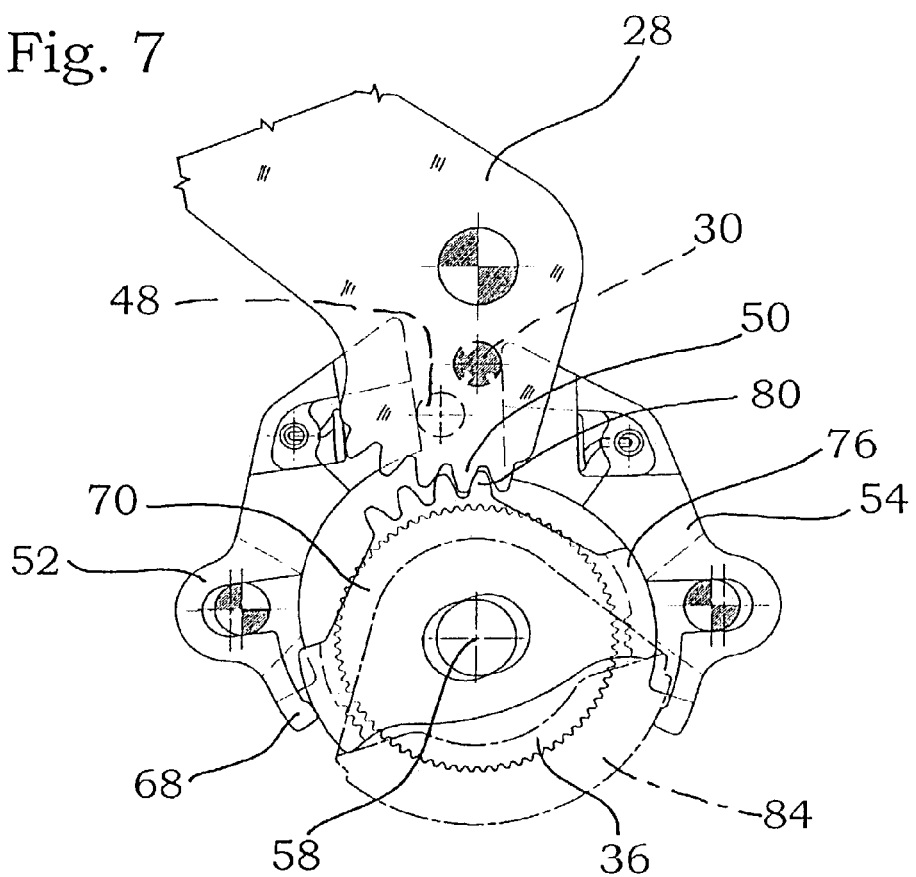
FIG. 7 is a top view of the third exemplary embodiment after completed transport and after decoupling.

As the driving force comes to an end, the position according to FIG. 7 is obtained starting from the representation in FIG. 6. As soon as the driving force diminishes and the hand lever 28 is pivoted against the direction of arrow 102, i.e., is moved back into the central position, the left lug 68 first pushes the pivotal lever 70, which is released from engagement in its right engagement region 76, to the right, second the pivotal lever 70 is displaced to the right through the return movement of the hand lever 28 and through the driving regions 50, 80, third the right engagement region 76 is pushed out of engagement with the adjustment wheel 36 because the teeth there no longer self-lock. The pivotal lever 70 reaches the position according to FIG. 7 in which it is released from engagement with the gear teeth of the adjustment wheel 36, i.e., in which it is decoupled. Now, the return stroke into the position according to FIG. 4 may be performed. The pivotal lever 70 is hereby guided by the spring lever 52, 54, it can not be moved into mesh with the gear teeth of the adjustment wheel 36 before it has not reached the initial position according to FIG. 4.

Figure 8:
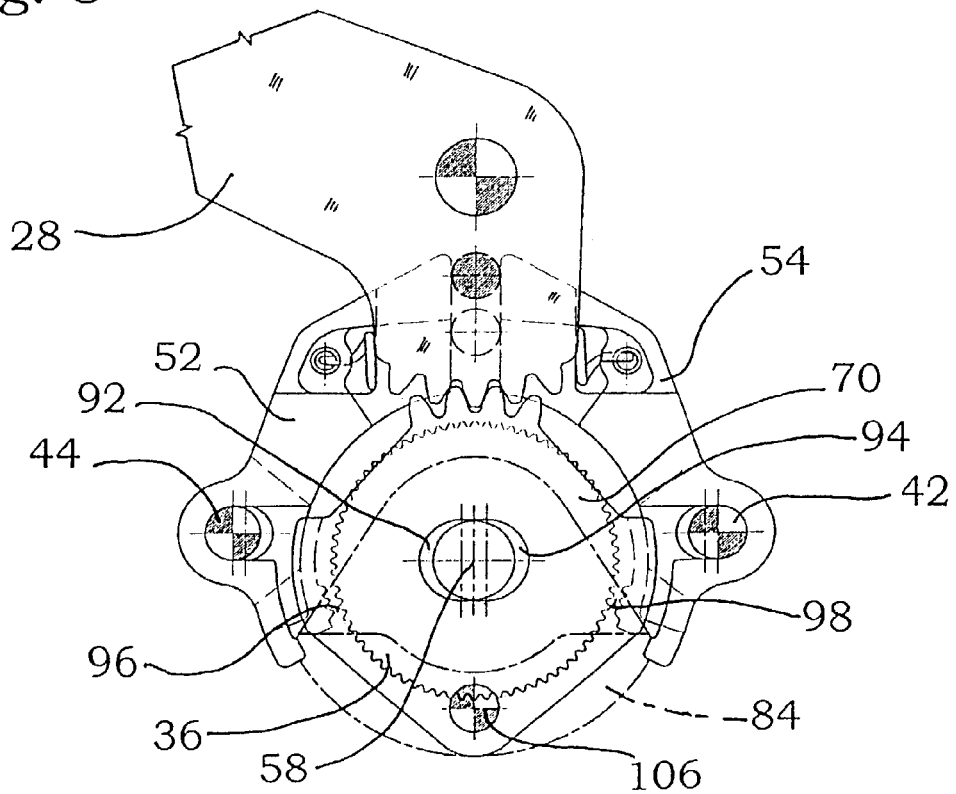

Eventually, FIG. 8 shows an embodiment in which, in addition to the third variant described with reference to the FIGS. 4 through 7, the pivotal lever 70 is additionally connected to the rotation fixation device 84 in a lower region thereof so as to be pivotal about a bearing 106. The bearing 106 is approximately located at the lowest point of the gear teeth of the adjustment wheel 36. In this exemplary embodiment, the sequence of movements is the same as has just been described with reference to the third embodiment. But now, the pivotal lever 70 is not plainly displaced, it is rather pivoted about the bearing 106. The supporting regions 88, 90 are either matched thereto or dispensed with.

The configuration of the rotation fixation device 84 may be surveyed from FIG. 9. The rotation fixation device 84 is carried in the bore 86 so as to be pivotal about the output shaft 58. The rotation fixation device forms a left supporting region (concealed) and a right supporting region 90. It is provided with a step 104 in the immediate proximity to each supporting region. It is advantageous to dispose elastic means between the supporting regions 88, 90 and the corresponding engagement region, for example to fasten an undulated leaf spring on each supporting region 88, 90.

The term "output shaft" is also to be construed as an axle journal that has the same axis as the output shaft and is not rotating in unison therewith.

The invention claimed is:

1. An actuation device of an adjustment unit for automotive vehicle seats, the device comprising:
   a) a hand lever,
      wherein the hand lever is in a central position when the actuation device is in a position of rest,
      wherein the hand lever may be pivoted alternatively in the two directions of rotation against the action of an elastic means biasing it in the central position, and
      wherein the hand lever has a first driving region;
   b) a frame that carries the hand lever and accommodates an output shaft;
   c) an adjustment wheel having circumferential gear teeth and being centered on the output shaft; and
   d) a pivotal lever
      wherein the pivotal lever has a long hole surrounding the output shaft,
      wherein the pivotal lever has a left engagement region and a right engagement region, both of these regions being formed integrally in one piece with the pivotal lever and being on the same part as the long hole, both of these regions being provided with teeth matching the gear teeth of the adjustment wheel and being disengaged from the teeth of the adjustment wheel in the position of rest of the actuation device,
      wherein the long hole is located in the center between the two engagement regions;
      wherein the long hole is oriented in lengthwise direction between the two engagement regions, and
      wherein the pivotal lever is provided with a second driving region that is in engagement with the first driving region of the hand lever.

2. The actuation device according to claim 1, wherein a rotation fixation device is assigned to the pivotal lever, which rotation fixation device is rotatably carried on the output shaft and is provided with a left and a right supporting region supporting a respective one of the associated left and right engagement regions.

3. The actuation device according to claim 1, wherein the pivotal lever is configured to substantially form an isosceles triangle, the engagement regions being located at the two ends of said isosceles triangle's base and being oriented substantially parallel to each other and the second driving region being positioned in spaced relationship from the base and is preferably arranged above the center of the base.

4. An actuation device of an adjustment unit for automotive vehicle seats, the device comprising:
   a) a hand lever,
      wherein the hand lever is in a central position when the actuation device is in a position of rest,
      wherein the hand lever may be pivoted alternatively in the two directions of rotation against the action of an elastic means biasing it in the central position, and
      wherein the hand lever has a first driving region;
   b) a frame that carries the hand lever and accommodates an output shaft;
   c) an adjustment wheel having circumferential gear teeth and being centered on the output shaft; and
   d) a pivotal lever
      wherein the pivotal lever has a long hole surrounding the output shaft,
      wherein the pivotal lever has a left engagement region and a right engagement region, both of these regions being provided with teeth matching the gear teeth of the adjustment wheel and being disengaged from the teeth of the adjustment wheel in the position of rest of the actuation device,
      wherein the long hole is located in the center between the two engagement regions;
      wherein the long hole is oriented in lengthwise direction between the two engagement regions,
      wherein the pivotal lever is provided with a second driving region that is in engagement with the first driving region of the hand lever, and
      wherein the first driving region is configured as a sector gear and the second driving region is provided with gear teeth meshing with the sector gear.

5. The actuation device according to claim 4, wherein, when the actuation device is in its position of rest, a first air gap is left free between the gear teeth of the adjustment wheel and the left engagement region, a second air gap is provided between the output shaft and a left end region of the long hole, a third air gap is left free between the gear teeth of the adjustment wheel and the right engagement region, a fourth air gap is provided between the output shaft and a right end region of the long hole, the first air gap being not greater than the second air gap, and the third air gap being not greater than the forth air gap.

6. The actuation device according to claim 1, wherein, when the actuation device is in its position of rest, the pivotal lever which is elastically biased adopts a central position in which central position the two engagement regions of the pivotal lever are released from engagement with the gear teeth of the adjustment wheel.

7. The actuation device according to claim 1, wherein the engagement regions have external faces centered on the axis of the output shaft and wherein a left spring lever and a right spring lever are provided each spring lever having a stop face, each stop face is free towards an inward direction, is centered on the axis of the output shaft and is located in immediate proximity to the external faces.

8. The actuation device according to claim 7,
   wherein the left and the right spring lever each have a driving face, the driving face of the left spring lever and the driving face of the right spring lever facing each other, a stop is arranged on the frame and a catch is arranged on the hand lever, the stop and the catch being located between the driving face of the left spring lever and the driving face of the right spring lever,
   wherein the left and the right spring lever each have a guide region in which they are pivotal about a left or a right guide axis rigidly mounted to the frame and are slidably guided in the direction of the long hole, and
   wherein the left and the right spring lever are urged by a spring acting along a line which is oriented beneath the stop and the catch and above the guide regions, the spring elastically biasing the two spring levers toward each other.

9. The actuation device according to claim 7, wherein the two spring levers are each provided with retaining means fixing the pivotal lever, which spring levers may be overcome when the torque applied to the pivotal lever is high enough.

10. The actuation device according to claim 1, wherein, when the actuation device is in its position of rest, the long hole is oriented transversely to a straight line that passes through the axis of the output shaft and through the pivot axis of the hand lever.

11. The actuation device according to claim 1, wherein, when the actuation device is in its position of rest, the long hole is oriented perpendicular to a straight line that passes through the axis of the output shaft and through the pivot axis of the hand lever.

12. The actuation device according to claim 3, wherein the second driving region is arranged above the center of the base.

13. The actuation device according to claim 7, wherein the two spring levers are each provided with retaining means fixing a rotation fixation device of the pivotal lever, which spring levers may be overcome when the torque applied to the pivotal lever is high enough.

14. An actuation device of an adjustment facility for automotive vehicle seats, the device comprising:
   a) a hand lever,
      wherein the hand lever is in a central position when the actuation device is in a position of rest,
      wherein the hand lever may be pivoted alternatively in the two directions of rotation against the action of an elastic means biasing it in the central position, and
      wherein the hand lever has a first driving region;
   b) a frame that caries the hand lever and accommodates an output shaft;
   c) an adjustment wheel having circumferential gear teeth and being centered on the output shaft; and
   d) a pivotal lever,
      wherein the pivotal lever has a long hole surrounding the output shaft,
      wherein the pivotal lever has a left engagement region and a right engagement region, both of these regions being formed integrally in one piece with the pivotal lever and being on the same part as the long hole, both of these regions being provided with teeth matching the gear teeth of the adjustment wheel and being disengaged from the teeth of the adjustment wheel in the position of rest of the actuation device, the two engagement regions and the long hole being in mirror image from a plane that lies in the center between the two engagement regions and is defined by an axis of the output shaft, and
      wherein the pivotal lever is provided with a second driving region that is in engagement with the first driving region of the hand lever.

15. An actuation device of an adjustment facility for automotive vehicle seats, the device comprising:
   a) a hand lever,
      wherein the hand lever is in a central position when the actuation device is in a position of rest,
      wherein the hand lever maybe pivoted alternatively in the two directions of rotation against the action of an elastic means biasing it in the central position, and
      wherein the hand leaver has a first driving region;
   b) a frame that carries the hand lever and accommodates an output shaft;
   c) an adjustment wheel having circumferential gear teeth and being centered on the output shaft; and
   d) a pivotal lever,
      wherein the pivotal lever has a long hole surrounding the output shaft,
      wherein the pivotal lever has a left engagement region and a right engagement region, both of these regions being provided with teeth matching the gear teeth of the adjustment wheel and being disengaged from the teeth of the adjustment wheel in the position of rest of the actuation device, the two engagement regions and the long hole being in mirror image from a plane that lies in the center between the two engagement regions and is defined by an axis of the output shaft, and
      wherein the pivotal lever is provided with a second driving region that is in engagement with the first driving region of the hand lever, whereby the first driving region is configured as a sector gear and the second driving region is provided with gear teeth meshing with the sector gear.

16. An actuation device of an adjustment facility for automotive vehicle seats, the device comprising:
   a) a hand lever,
      wherein the hand lever is in a central position when the actuation device is in a position of rest,
      wherein the hand lever may be pivoted alternatively in the two directions of rotation against the action of an elastic means biasing it in the central position, and
      wherein the hand lever has a first driving region;
   b) a frame that carries the hand lever and accommodates an output shaft;
   c) an adjustment wheel having circumferential gear teeth and being centered on the output shaft; and
   d) a pivotal lever,
      wherein the pivotal lever has a long hole surrounding the output shaft,
      wherein the pivotal lever has a left engagement region and a right engagement region, both of these regions being provided with teeth matching the gear teeth of the adjustment wheel and being disengaged from the teeth of the adjustment wheel in the position of rest of the actuation device, the two engagement regions and the long hole being in mirror image from a plane that lies in the center between the two engagement regions and is defined by an axis of the output shaft,
      wherein the pivotal lever is provided with a second driving region that is in engagement with the first driving region of the hand lever, wherein when the actuation device is in its position of rest, the pivotal lever which is elastically biased adopts a central position in which central position the two engagement regions of the pivotal lever are released from engagement with the gear teeth of the adjustment wheel, and the engagement regions have external faces centered on the axis of the output shaft and
      wherein a left spring lever and a right spring lever are provided, each spring lever having a stop face, wherein each stop face faces inwardly and is centered on the axis of the output shaft and wherein each stop face is located in immediate proximity to the external faces.

* * * * *